United States Patent [19]

Lundahl et al.

[11] 4,187,990
[45] Feb. 12, 1980

[54] METERING STACK FEEDER AND METHODS

[75] Inventors: Ezra C. Lundahl, Providence, Utah; J. Gordon Wiser, Kirkland, Wash.

[73] Assignee: Ezra C. Lundahl, Inc, Logan, Utah

[21] Appl. No.: 917,994

[22] Filed: Jun. 22, 1978

[51] Int. Cl.² .................... B02C 18/06; B02C 21/02
[52] U.S. Cl. ........................................ 241/30; 83/490;
  241/101 A; 241/101.3; 241/101.7; 241/283
[58] Field of Search ............... 241/30, 101 A, 283,
  241/101.3, 101.7; 83/869, 23, 42, 150, 155, 490,
  928

[56] References Cited

U.S. PATENT DOCUMENTS

| | | | |
|---|---|---|---|
| 2,671,478 | 3/1954 | Anderson et al. | 83/869 X |
| 3,654,977 | 4/1972 | Benno | 241/277 |
| 3,773,269 | 11/1973 | Brooks et al. | 83/490 X |
| 3,830,438 | 8/1974 | Garrison et al. | 241/283 |
| 3,857,425 | 12/1974 | Wiklund | 83/490 X |
| 3,920,190 | 11/1975 | Kunengleter et al. | 241/283 X |
| 4,065,062 | 12/1977 | Heslop | 241/280 X |

*Primary Examiner*—Frank T. Yost
*Attorney, Agent, or Firm*—Lynn G. Foster

[57] ABSTRACT

Apparatus and method for cutting and feeding a metered or controlled amount of foliage material from the stack, the apparatus comprising an underlying wheeled framework, capable of being displaced along the ground by a tractor or the like, a tiltable bed thereon disposed in a parallel position between the wheels and a powered conveyor so that a stack of foliage may be loaded onto the bed from a position on the ground (or unloaded from the bed back to the ground) and also may be successively advanced a short distance along the conveyor bed until the desired amount of stack foliage overhangs a transverse conveyor. A vertically or horizontally reciprocal cutting arm with a rotating disc blade at its distal end is cantilevered from a horizontally reciprocal rotatable vertical mast which is disposed alongside and extends over the transverse conveyor at the leading end of said framework and is thereby able to travel horizontally and vertically in a zig-zag pattern either top to bottom or bottom to top or both to successively cut arcuate strips of foliage from the overhang of the stack. Sliced foliage rolled off of a deflector shield and falls under force of gravity substantially continuously as it is cut onto the transverse foliage conveyor at the front of the vehicle and is discharged from the feeder.

18 Claims, 10 Drawing Figures

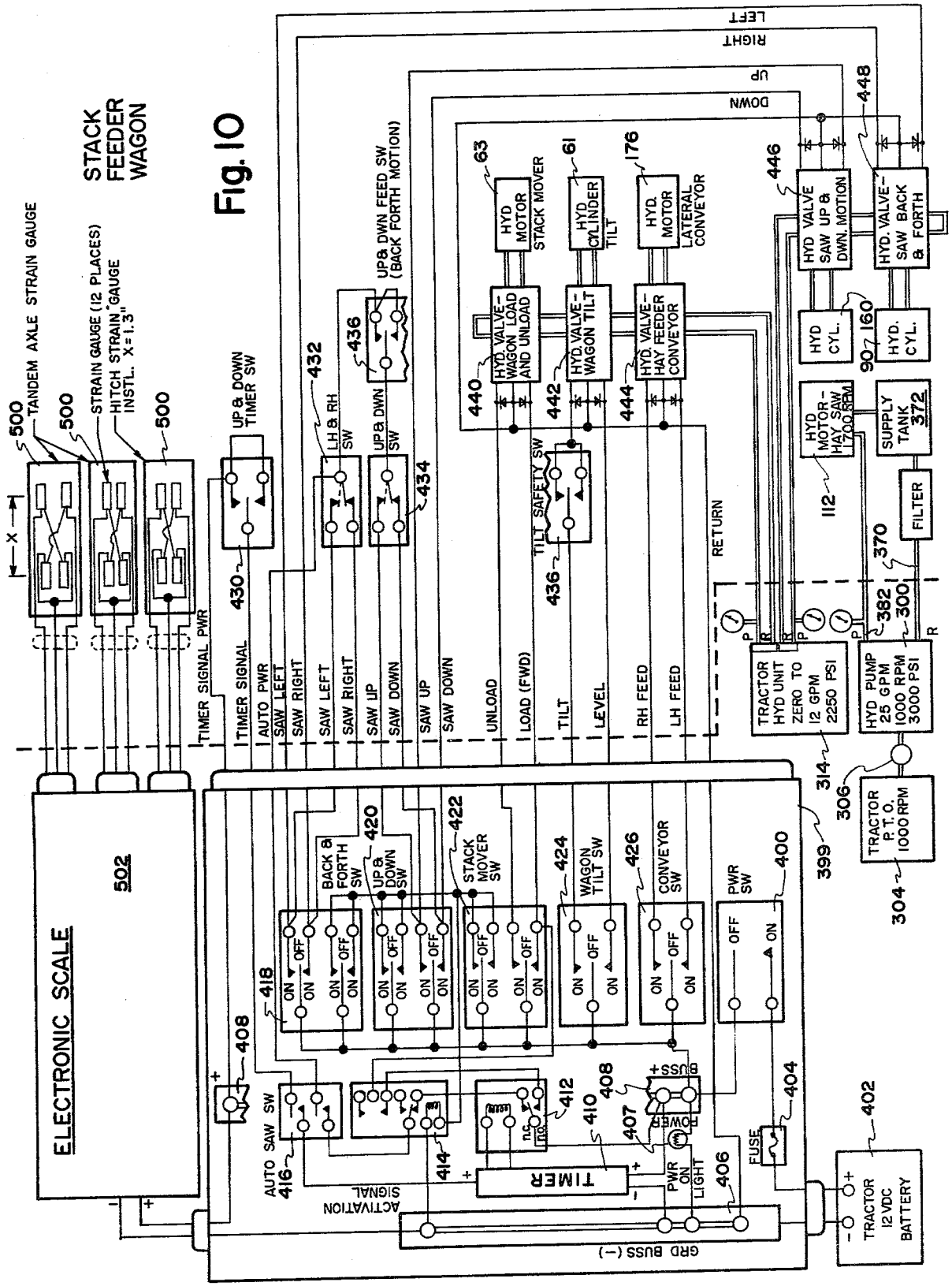

METERING STACK FEEDER AND METHODS

BACKGROUND

1. Field of Invention

The present invention relates broadly to automated distribution of stacked foliage. More particularly, the present invention relates to a metering stack feeder and method for cutting a selected amount of foliage from a stack disposed upon the feeder at a selected rate and subsequently conveying the cut foliage from the feeder, such as into a windrow upon the ground for range feeding of livestock. The present invention also comprises weighing each loaded stack, predetermining the amount of foliage to be fed providing a continuous readout of the amount of foliage being fed and issuing a signal when the correct amount has later been fed.

2. Prior Art

Powdered foliage stack cutters of the prior art have been carried by a transporting wagon equipped with stack loading and advancing conveyors, along with a lateral conveyor to transport cut foliage from the wagon onto the ground or elsewhere for feeding or processing. See. U.S. Pat. No. 3,741,051; 3,773,269; 3,830,438 and 4,037,740. These prior art stack cutters have been constrained to a single fixed cutting pattern and at a fixed rate at which cutting occurs. None suggest or imply a need or capability for adjustment in the speed of the cutter blade, the depth of cut, the pattern of the cut or the rate of displacement of the cutter. Most of said stack feeders have cutting means at the ends of cantilevered supports, thereby providing cutting means which are only capable of vertical movement. This frequently results in clogging and binding between the cutter and a cut by the cutter as well as interference between the stack per se and the cutter during the return stroke of the cutter, if any. U.S. Pat. No. 3,773,269 is the one exception, its cutter blade traveling in a roughly polygonal path which requires complex driving mechanisms. The cutters (see the reciprocating sickle blade cutters of U.S. Pat. Nos. 3,741,051 and 3,830,438 and the knives of U.S. Pat. No. 4,037,740) and the mechanisms by which each of the cited patents is driven are generally complex or of somewhat obsolete, inefficient character with limited capacity.

All of said prior art approaches have utilized to substantial extent an angular cut, top to bottom and do not teach the capacity nor the advantages of making a selectively controlled zig-zag cutting pattern. None of the patents disclose the concept of selectively varying the cut so as to meter the amount of feed displaced by the lateral conveyor depending upon such factors as density and food value. U.S. Pat. No. 4,037,740 requires a plurality of opposed blades for cutting transversely across a stack, and raking means upon the an elevated lateral conveyor to dislodge and discharge the cut foliage from the wagon by tumbling it down the side of the stack. The remaining patented prior art proposals each require a cutter of substantial width and length, two requiring a cutter equal to or greater than the width of the stack and the other requiring a blade with at least equal width to one-half the width of the stack and all three require either a separate vibrator or flipper or a rotating deflector to cause the hay being sliced to separate from the stack and the cutter and fall upon the lateral conveyor. Because of the precise complex pattern of displacement of the blade of U.S. Pat. No. 3,773,269, it is incapable of being displaced upward other than when contiguous with the right side of the stack and, therefore, cannot be used to directly retract into an elevated position with the cutter severing any interfering hay during said retraction. Further, neither of the cutting mechanisms of U.S. Pat. No. 3,741,051; 3,830,438 and 4,037,740 has any capacity whatsoever to cut interfering foliage from the stack or otherwise while being retracted to the elevated position.

None of the prior art teaches the need for knowing the weight of the stack for an accurate feeding program without traveling to expensive scales in a central weighing area, nor do they mention a need or a method for predetermining the amount of hay to be fed per head. The prior art does not teach any way of knowing when the correct amount of hay has been fed even if one could predetermine the amount. Also, the prior art fails to teach keeping of a foliage inventory during the harvesting and the feeding season. The prior art teaches generally a semi-automatic feeding method with little or no manual manipulation possible of the various operations of the stack cutters if for any reason, such as a low stack wherein it takes the blade time to work its way down into the stack, the operator desires to override the system.

BRIEF SUMMARY AND OBJECTS OF THE INVENTION

The present invention substantially alleviates or overcomes the above-mentioned limitations of the prior art by providing novel method and apparatus, which apparatus is relatively simple and inexpensive to manufacture and maintain, and further provides a large degree of flexibility in the use thereof. The present preferred embodiment of the invention comprises a stack feeder wagon or vehicle provided with a bed and a conveyor to load the stack onto the bed and to incrementally advance the stack forwardly. A transverse conveyor discharges foliage cut from the stack to either side of the wagon. A variable rotating stack cutter cuts and removes foliage from the stack, with the blade cutting an angle always acutely disposed in respect to the stack so as to relieved any tendency to bind the cutting blade and transports it from the wagon without binding, clogging or bunching. The cutter is disposed at the proximal end of a cantilevered arm which arm is attached to a rotatable mast with reciprocal horizontal displacement thereby providing for any desired pattern of displacement, e.g. top to bottom and/or a bottom to top in a generally zig-zag pattern of composite displacement, or circular. The feeder apparatus may be administered manually or through electronic instrumentation. The stack advancement to the desired depth of cut during each cutting path, the rates of horizontal and vertical displacement and the rotational displacement may be controlled automatically. Stack weight may be electronically calculated and the instrumentation may be selectively caused to meter from the machine a controlled amount of foliage per unit of time, taking into account variations in density and moisture content. A complete inventory of cumulative foliage harvested and foliage feed therefrom is contemplated by the present invention.

Accordingly it is a primary object of the present invention to provide simplified and novel apparatus for and methods of controlled cutting and feeding foliage from a stack upon a vehicle.

Another object of the invention is to provide novel apparatus for feeding foliage from a stack upon a vehicle requiring minimum personnel and minimum attention of the operator thereof.

Another object of the invention is to provide novel apparatus for feeding foliage from a stack carried upon a vehicle which apparatus is controlled to accommodate stacks of varying sizes and shapes.

Another object of the invention is to provide a novel apparatus and a unique method for feeding foliage from a vehicle supported stack.

Another important object of the invention is to provide a cutting mechanism comprising a vertically reciprocal cutting arm, with the cutting blade disposed at the distal end of the arm which is cantilevered from a horizontally reciprocal rotatable vertical mast.

Another object of the invention is to provide novel apparatus and method for feeding foliage from a stack upon a vehicle wherein juxtaposed strips of foliage are sequentially sliced from one end of the stack.

A further object of the invention is to provide a deflector shield adjacent the cutter blade to facilitate the fall of the cut foliage onto the transverse conveyor.

A further important object of the present invention is to provide novel variable stack feeder metering apparatus and method for selectively displacing a stack forwardly in controlled increments to overhang a lateral conveyor while a cantilevered cutter arm comprising a cutter blade is in an elevated or a lowered side position, the amount of overhang thereby defining the thickness of the cut to be made from the stack, with the rates of horizontal and vertical displacement of the cutter blade being controlled.

An additional object of the invention is to provide a safety screening off of the cutting area to eliminate injury to livestock and personnel.

A further object is the provision of a novel simplified and economical stack feeder having one or more of the following features: a variable though elemental cutting pattern and/or cutting and discharge rate to accommodate, for example, variations in density, moisture content and stack dimensions; a generally vertically directed cut of two dimensional convex cutting pattern to enhance separation of cut foliage from the remainder of the stack and elimination of interference with the stack without the need of other moving parts such as vibrators for separation; a relatively small cutter requiring a series of passes to cut an entire slice from the stack; a mechanism which cuts any interfering hay during the return of the cutter to its beginning position; and a simplified rotating cutter which eliminates reliance upon several cutters.

A further object is the provision of a novel cutter blade for a stack feeder for long term lift and efficiency.

A further important object of the invention is the provision for controlling the cutting process, whereby the operator is informed of the instantaneous stack weight and the amount of foliage dispersed.

Another important object is the inventorying and updating of the inventory periodically of foliage harvested and placed in storage as well as foliage removed from storage and fed to livestock;

Another paramount object of this invention is the provision of a system for selecting a predetermined amount of foliage to be dispersed, from a stack feeder, dispersing the same and issuing a warning when the predetermined amount has been dispersed.

These and other objects and features of the present invention will be apparent from the detailed description taken with reference to the accompanying drawings.

BRIEF DESCRIPTION OF THE DRAWINGS

FIG. 10 is a schematic of an electronic control system for the stack feeder of FIG. 1.

DETAILED DESCRIPTION OF THE ILLUSTRATED EMBODIMENT

Reference is now made to the drawings wherein like numerals designate like parts throughout and which illustrate a presently preferred stack feeder embodiment, generally designated 10, according to the present invention.

Figure 1:
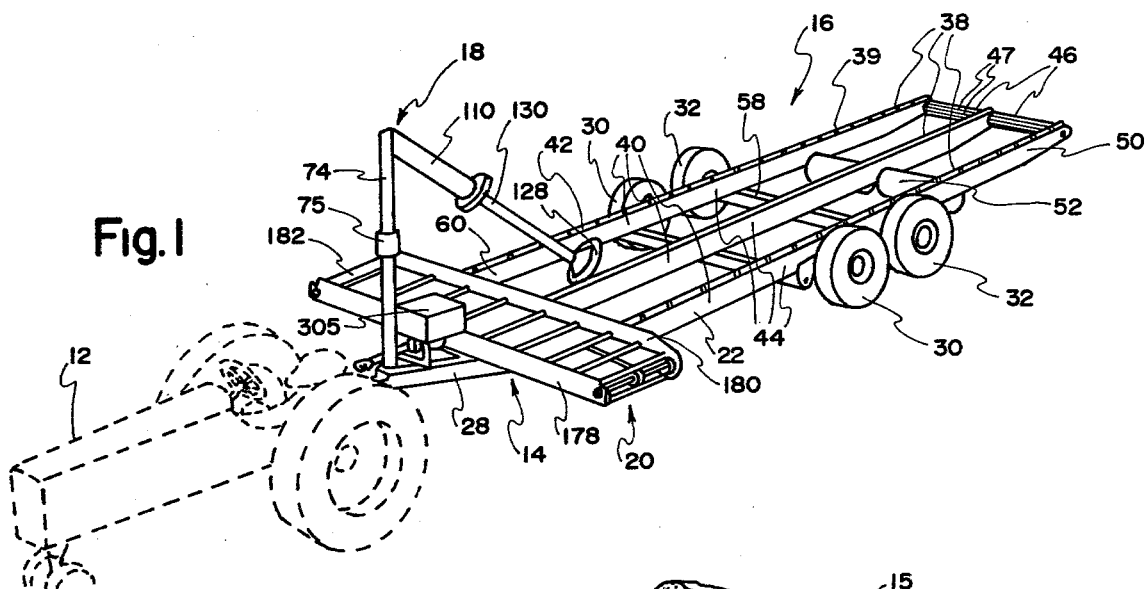
FIG. 1 is a perspective representation of a presently preferred stack feeder machine shown according to the present invention attached to a farm tractor (shown in phantom)

FIG. 1 shows the stack feeder 10 attached to a tractor 12 which tractor 12 or other suitable vehicle serves as a power source, both for moving the feeder machine 10 along the ground and for operating the various parts of said machine 10. The machine 10 could also be self propelled, if desired.

Feeder machine 10 comprises a stationary wheel supported frame, generally designated 14, a tiltable stack conveyor loading platform, generally designated 16, a stack cutting mechanism, generally designated 18, and a transverse conveyor generally designated 20, for dispersing the cut foliage material from the feeder 10.

Said underlying frame 14 comprises two parallel members 22 which bend inwardly at points 24 and converge in a point 26 thereby forming a V-shaped tongue 28. Along the leading point 26 of the V is welded an inverted L-shaped plate 78. Two side by side axle housings (not shown) which carry two sets of wheels 30 and 32 are suitably attached to the parallel side members 44 of the tiltable stack loading platform. Lug 34 welded at 80 to plate 78 in vertical orientation with aligned vertical apertures 36 therethrough comprise a hitch at point 26 of frame 14.

A plurality of transverse support braces (not shown) extend from one parallel member 22 to the other 22. Said stack conveyor 16 comprises three endless chains 38 each chain 38 rotatably sandwiched between parallel elongated containing members 40. Said chains 38 are on a track (not shown) which track exposes said chains 38 along the top edge of containing members 40 and which chains 38 execute the remainder of their continuous cycle on a track (not shown) while concealed within the interior of containing members 40.

Said chains 38 and members 40 form three units 44 spaced parallel from one another which units 44 together form one flat plane. Said units 44 are kept parallel partly by means of rotatable spacer rollers 46 containing evenly spaced longitudinal protuberances 47 around the circumference of said rollers 46 which rollers 46 are carried by a fixed axle 48 which axle 48 is threaded through the trailing ends 50 of elongated containing members 40 and by large rollers 52 which rotate around an axle 54, said axle 54 being secured through lugs 56 which lugs 56 (not shown) are attached to and extend from the bottom of elongated containing members 40 at a transverse point towards the trailing end 50. Units 44 are also kept in parallel spaced relation by a plurality of transverse rods 58 suitably attached to the undersides of elongated containing members 40.

The chains 38 therein engage a power drive and sprocket (not shown) which causes said chains 38 to rotate.

Units 44 comprise one tiltable platform, the tilt of which is controlled by hydraulic cylinder 61 (not shown). When the trailing end 50 of stack conveyor 16 is lowered to the ground and disposed beneath one edge of the stack 15, the evenly spaced teeth 39 upon the continuous chains 38 engage the underside of the stack 15 and a hydraulic motor 63 (not shown) rotating said chains 38, moves the stack 15 onto the flat plane of the stack conveyor 16 in a manner well known to the prior art. Large rollers 52 contiguously engage the ground when trailing end 50 is in the mentioned lowered position and facilitate the ongoing movement of said feeder 10.

The feeder machine 10 cutting mechanism 18 comprises a hollow cylindrical rotating mast 74 mounted vertically at the apex 26 of the tongue 28 in a bearing 71. A hollow cylindrical mast support bearing 76 surrounds mast 74 and is disposed at a point approximately midway along the length of the mast 74. A front bracing rod 84 is diagonally disposed between and attached to bearing 76 at site 75 and the bottom of the foot on the inverted shaped hitch plate 78 at site 73. Two additional bracing rods 86 are diagonally disposed between and attached to bearing 76 at site 77 and a lug 88 on the top surface of each side of the tongue 28 at a substantial distance from rotating mast 74.

A two-way hydraulic cylinder 90 is rotatably secured by a clevis 92 and a clevis pin 94 through an L-shaped lug 96 attached to the top surface of tongue 28. The piston rod 98 of cylinder 90 is rotatably attached by a clevis 100 and a clevis pin 102 to a lug 104 which is rigidly secured around the base of mast 74.

Figure 6:
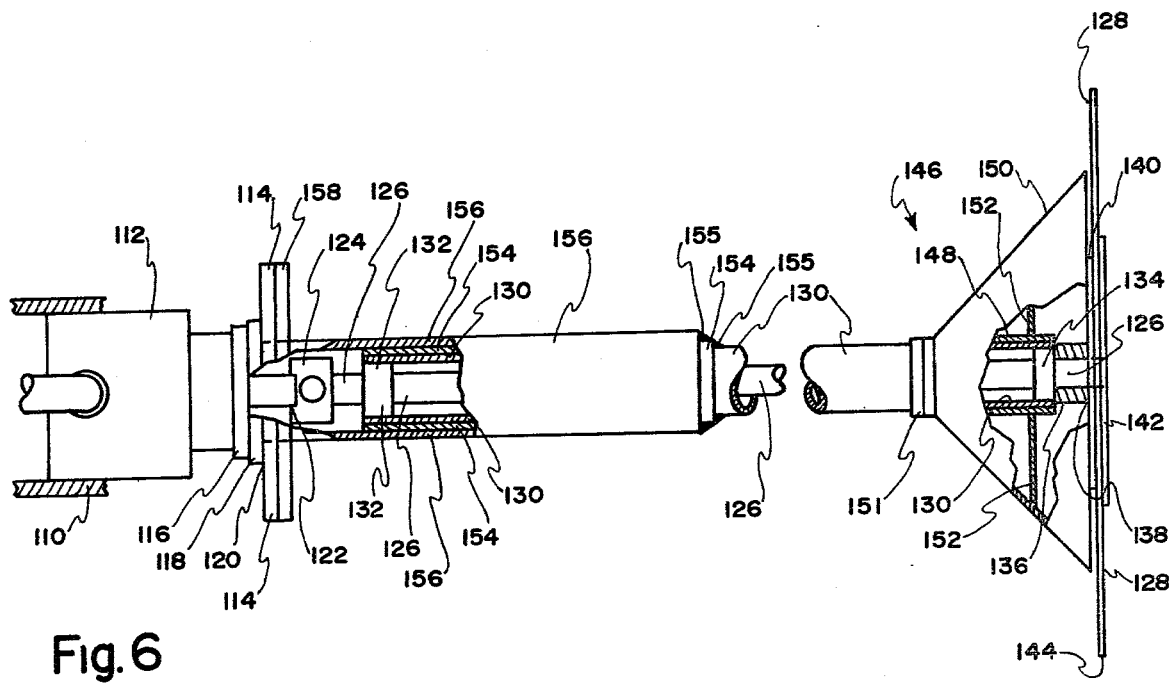
FIG. 6 is an enlarged plan view illustrating the interior of the cutter arm, theerotating cutter blade and the shaft which drives the blade enclosed in a housing comprising a stationary foliage deflector shield and attached to a hydraulic motor which drives the blade.

A large clevis 106 on the proximal end of hollow cutter arm 110 is pivotally secured to the top of mast 74 by a pin 108 for up and down arm movement. An annular mounting plate 114 is disposed about and rigidly connected to the distal end of cutter arm 110. A hydraulic motor 112 is disposed within the interior distal end of cutter arm 110. (See FIGS. 4 and 6). The motor 112 carries a flange 116 secured to a plate 118, which plate 118 is attached, as by welding at site 120, to the back side of cutter arm mounting plate 114 thereby rigidly securing the motor 112 within the cutter arm 110.

An output shaft 122 from the motor 112 rotatably passes through central apertures in flange 116, plate 118, plate 114, and a further plate 158 and universal joint 124 to drive a rotatable cutter drive shaft 126. Shaft 126 drives the disc shaped cutter blade 128. Shaft 126 is coaxially disposed within a hollow cylindrical tube housing 130. Sealed interior ball bearings 132 and 134, through which the drive shaft 126 passes align and journal the shaft for high speed rotation. The outer race of bearing 132 is press fit in the trailing end of tubular housing 130, while the outer race of bearing 134 is press fit within the leading end of housing 130.

A hub 136 fits snugly and permanently into the interior proximal end of tube 130 alongside ball bearings 134. Hub 136 is welded 138 to a circular saw mounting plate 140. Plate 140 fits contiguously behind cutter blade 128. Blade 128 is affixed contiguously to plate 140 and an exposed cutter mounting plate 142. Note that the cutting edge 144 of the blade 128 extends beyond the circumferences of the mounting plate 140 and supporting plate 142 between which two members the blade 128 is disposed.

Tube housing 130 preferably carries a stationary conical foliage deflector 146 affixed to its proximal end to tube 130. Deflector shield 146 comprises a short hollow cylindrical collar 148 disposed about exterior distal end of tube 130. A hollow cone 150 formed of sheet metal is attached to the trailing end of tube 148 and flares outwardly over the body of tube 148 and extends until it nearly touches the blade 128. A stiffening annular support plate 152 spans between and is attached to the exterior body of tube 148 and the interior surface of cone 150 at a point approximately midway along each. The deflector shield 146 is free to rotate around tube 130 and is held longitudinally in place by two locking collars 51.

Two reinforcing tubes 154 and 156 are superimposed concentrically over tube 130 adjacent flange 158. The concentric coaxial tubes 130, 154 and 156 do not rotate and are welded together at sites 155. The distal end of tube 156 is welded to the annular mounting plate 158. Plate 158 mates with and preferably attaches to mounting plate 114 by removably connecting bolts (not shown) to facilitate maintenance.

A second hydraulic cylinder 160 having a piston rod 161 is disposed between the rotating mast 74 and the arm 110. More specifically, the cylinder 160 is pivotally attached at site 164 to a lug 162 by a pin. The piston rod 161 is pivotally attached to the cutter arm clevis 106 by a pin 166. Thus, the cutter arm 110 may be selectively vertically pivoted about the pin 108 by the selective extension and retraction of the piston rod 161 of cylinder 160 thereby moving the blade 128 up and down with respect to the stack 15.

Figure 4:
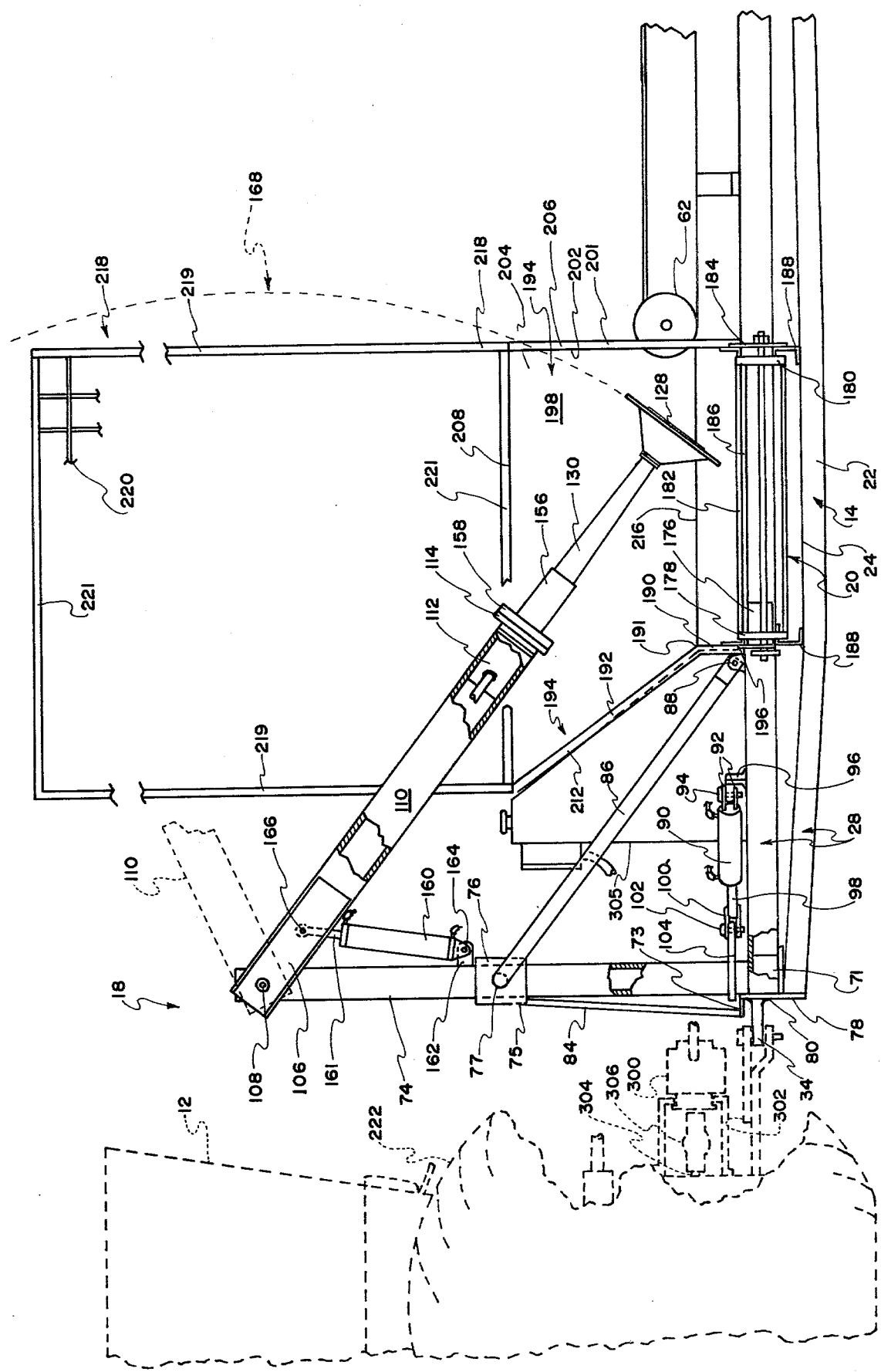
FIG. 4 is an enlarged fragmentary side elevation view of the forward portion of the stack feeder of FIG. 1 showing details of the rotating cutter blade, the cutter arm and the support mast along with the lateral conveyor and the leading portion of the stack mover conveyor.
Figure 5:
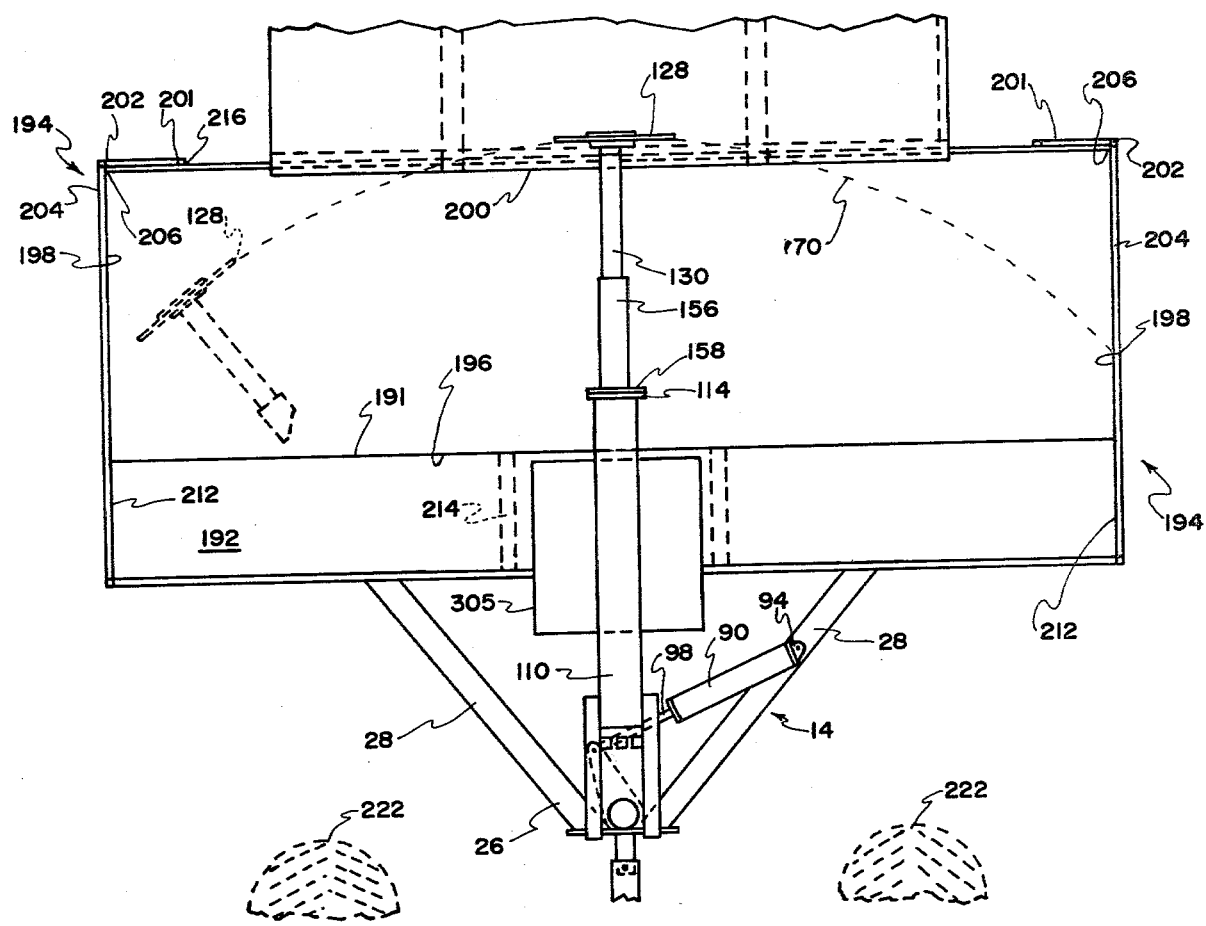
FIG. 5 is an enlarged plan view of the stack feeder of FIG. 1 illustrating the forward portion thereof with the deflector removed and showing the sweep of the rotating cutter blade and the cutter arm.

As shown in FIG. 5, cylinder 90 causes cutter blade 128, in the illustrated embodiment, to be displaced through a horizontal angle of on the order of about eighty degrees by rotation of the central mast 74 position. As shown in FIG. 4, cylinder 160 causes cutter blade, in the illustrated embodiment, 128 to be displaced from a position from about thirty-seven degrees below horizontal to forty-three degrees above horizontal.

Figure 2:
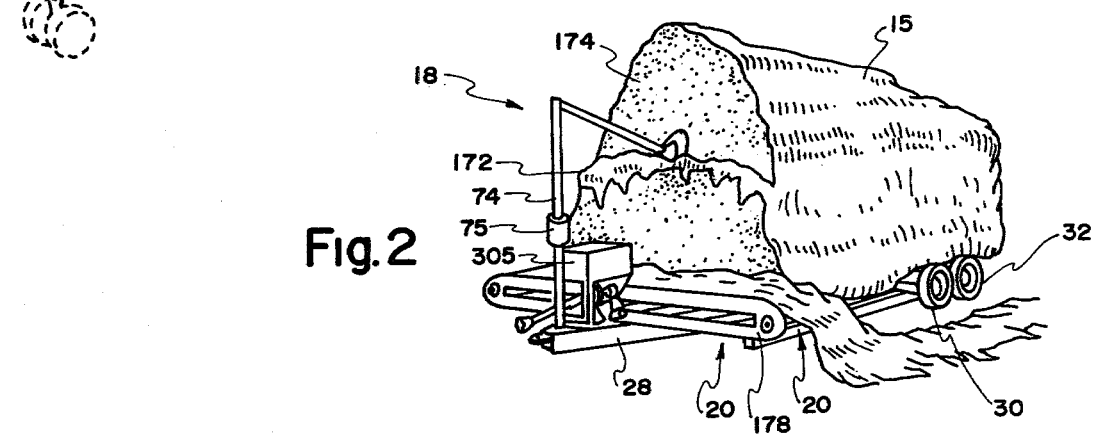
FIG. 2 is another perspective representation of the stack feeder machine of FIG. 1 the machine during the course of cutting a strip of foliage from a stack and dispersing the cut foliage from the machine as a windrow.

Each strip slicing sweep of the cutter blade 128 is generally arcuate as is illustrated by horizontal line 170 in FIG. 5. The composite downward motion is also arcuate as shown by line 168 in FIG. 4. The cutter blade 128 may be operated to cut successive horizontal arcuate swaths or strips 172 (FIG. 2) at decremental or incremental vertical positions thereby creating a somewhat two dimensionally convex face 172 across the full exposed leading edge of the stack 15, the deflector 146 aiding in the separation of the strip 174 from the stack 15. Since arcuate blade displacement in both of two dimensions is provided the blade may be caused to sweep and increment at the end of each sweep in any two generally perpendicular directions. By simultaneously sweeping and incrementing continuously a spiral though arcuate cut of uniform thickness can be made at the face 174 of the stack 15. Thus, if desired the grain of the foliage may be followed, including the grain of a rolled bale of hay.

The transverse conveyor 20 is disposed generally beneath the path traversed by the cutter blade 128. Conveyor 20 comprises two parallel endless chains 178 and 180 defining the width of the transverse conveyor 20, said chains carrying a plurality of evenly spaced U-shaped slats 182, the terminal ends of which point outwardly from the elongated circular paths described by said chains. An elongated flange 184 is disposed alongside the exterior of chain 180 of the transverse conveyor 20 adjacent stack conveyor 16. A stationary flat elongated rectangular plate 186 is disposed underneath the slats 182 and the top run of the chains 178 and 180 thereby providing a shield preventing foliage from falling through the slats 182.

Reversible hydraulic motor 176 is disposed between chains 178 and 180 adjacent to and connected with chain 178 in a conventional manner to selectively power the transverse conveyor 20. The slats 182 can be made to move in either lateral direction by reversing motor 176 to thereby discharge foliage from either side of feeder machine 10. C-shaped beams 188 rest upon and connect to the frame 14, and support conveyor 20. A vertical wall 190 is disposed forward of and extends upwardly from conveyor 20. Wall 190 merges with an angular wall 192 at site 191.

Said vertical wall 190 and angular wall 190 comprises one face of a three-sided foliage hopper, generally designated 194. Hopper or bin 194 generally comprises (a) one complete elongated face comprising walls 190 and 192 adjacent the forward edge 196 of conveyor 20, (b) two perpendicular end face 198 and two short walls 201 respectively contiguous with but perpendicular to the adjacent face 198 and each parallel to the trailing edge 200 of conveyor 20. Each side end piece 201 comprises an elongated solid rectangular plate disposed vertically and connected alone one longitudinal edge 202 to a vertical edge of end plate 204 (comprising surfaces 198). The perimeter of each end plate comprises seriatim a straight vertical edge 206, a horizontal edge 208, a diagonal edge 212 and a horizontal edge 210. Edge 210 may be placed at any location to accommodate discharge of strips of sliced foliage. Edge 206 entirely contiguous with plate 201 and edge 212 is entirely contiguous with diagonal plate 192. Pin 194 may comprise sheet steel or other suitable material and is for the purpose of guiding the gravitational fall of successive sliced strips 172 of foliage onto the top of transverse conveyor 20, by which the foliage is discharged from the machine 10.

A metal framework 218 comprising vertical and horizontal members 219 and 221 is attached along each of the top edges 208 of bin 194. The interior of framework 218 is span by an open, wide mesh screen 220 or the like. The resulting safety shield helps prevent accidental injury to livestock or personnel during operation of the cutting blade of the machine 10.

Hydraulic pump 300 is carried by the tractor 12 at the rear thereof and is connected to the power take-off 304 of the tractor 12 through a universal joint 306. The tractor comprises wheels 222 of which are indicated in FIGS. 4 and 5. The hydraulic pump motor 300 pressurizes hydraulic fluid and selectively communicates the hydraulic fluid under pressure through a hydraulic line to blade hydraulic motor 112 mounted internally within the cutter arm 110. The motor 112 returns fluid through hydraulic lines to a hydraulic supply tank 306 carried on the frame 14 of the machine 10 adjacent the tongue. The hydraulic system of the tractor 12 supplies the pressurized hydraulic fluid to selectively operate the cutter arm up and down hydraulic cylinder 160, the cutter arm back and forth hydraulic cylinder 90, the transverse conveyor hydraulic motor 176, the stack mover hydraulic motor 63, and the tilt cylinder 61.

Figure 7:
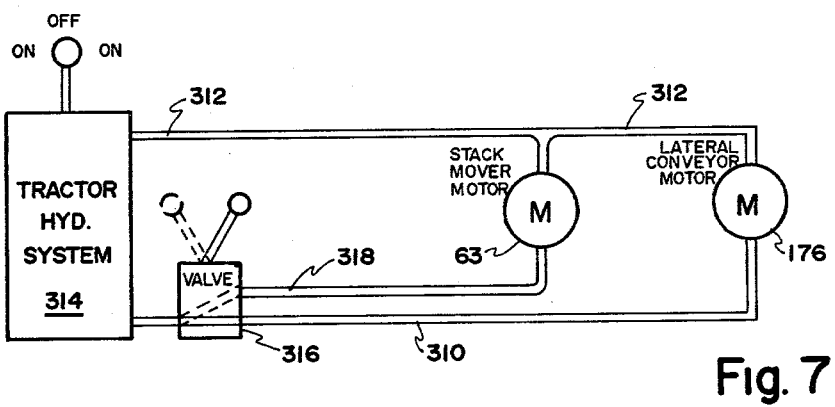
FIGS. 7, 8 and 9 are hydraulic schematic diagrams of a set of controls for the stack feeder wagon of FIG. 1.
Figure 8:
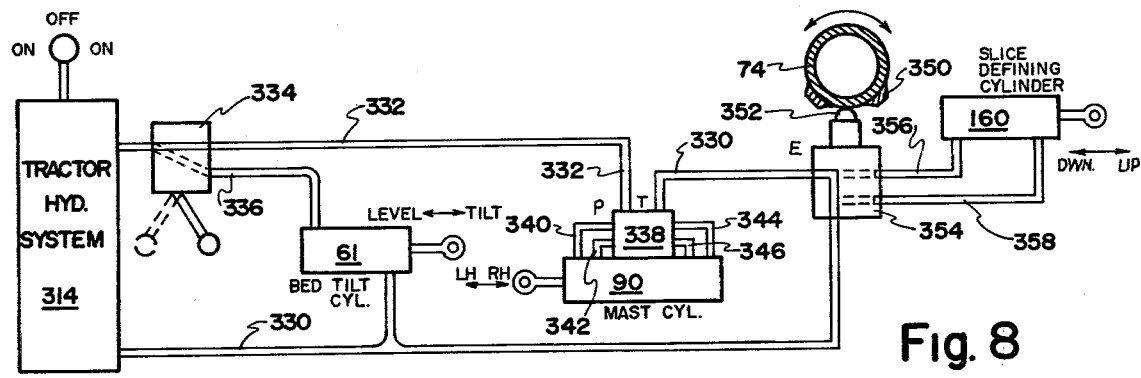
Figure 9:
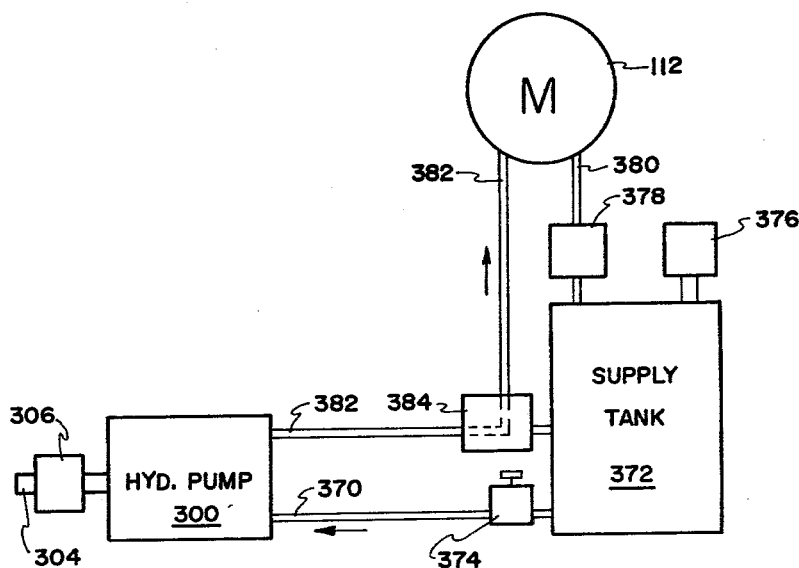

Reference is now made specifically to FIGS. 7, 8 and 9 which illustrate one presently preferred set of hydraulic controls for operating the stack feeder 10. In reference to FIG. 7, a pair of master fluid lines 310 and 312 connect to the tractor hydraulic system 314 which may be placed in an "off" condition or in either of two "on" positions alternatively delivering hydraulic fluid under pressure to lines 310 and 312 with the other of said lines at any point in time serving as the return line. The indicated reversal of hydraulic flow accommodates reversed displacement of either stack mover motor 63 or lateral conveyor motor 176. Assuming a stack 15 of foliage has been loaded upon the stack feeder 10 in the manner previously described, the stack 15 may be advanced to overhang the lateral conveyor 20 a desired distance by placing the three way, two position valve 316 in its dotted position causing fluid under pressure to be delivered from the tractor hydraulic system 314 through the valve 316 and along fluid line 318 to rotate the motor 63 and advance the stack using the previously described bed chain conveyors 38 a desired distance, with hydraulic fluid being discharged from motor 63 through line 312 to the tractor hydraulic system 314. Advancement of the stack is terminated by either placing the tractor hydraulic system 314 in the "off" position or shifting control valve 316 to the solid position illustrated in FIG. 7.

Reverse displacement of motor 63 occurs when the tractor hydraulic system 314 delivers hydraulic fluid under pressure to line 312 driving the motor 63 in the opposite direction to retract or unload the stack 15 as desired, with hydraulic fluid being discharged from motor 63 through line 318 across the valve 316 (with the valve 316 in the dotted position) to the tractor hydraulic system 314.

The lateral conveyor 20 is caused to be displaced in one direction by placing valve 316 in the solid position illustrated in FIG. 7 which accommodates delivery of hydraulic fluid under pressure along line 310 to rotate motor 176 in a first direction, with hydraulic fluid being discharged from motor 176 returning to the tractor hydraulic system 314 along line 312. By placing the hydraulic tractor system in the opposite "on" position, hydraulic fluid under pressure is oppositely delivered to motor 176 along line 312 causing the lateral conveyor to be displaced in the other direction, with discharged hydraulic fluid from motor 176 being returned to the tractor hydraulic system 314 along line 310 and across valve 316, valve 316 being in the solid position illustrated in FIG. 7.

Figure 3:
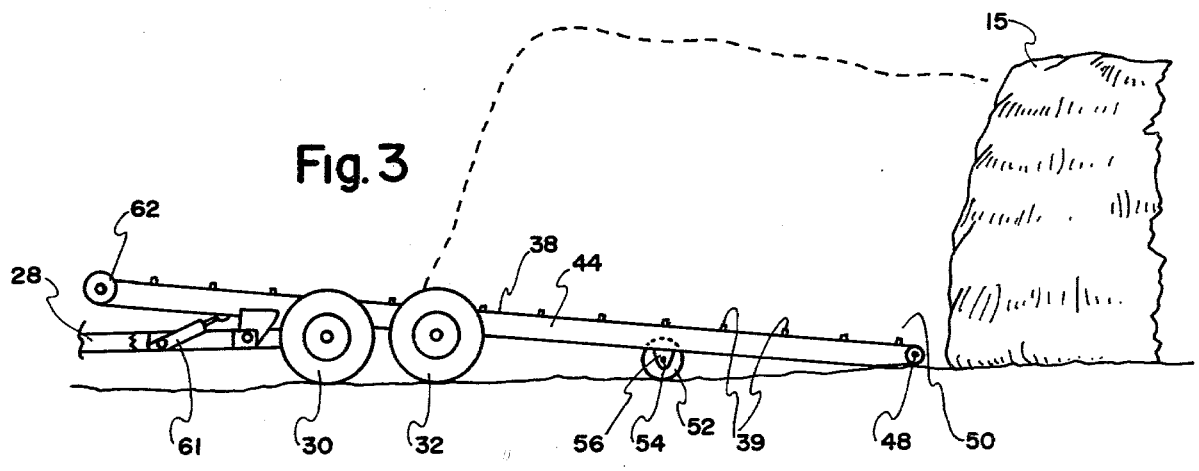
FIG. 3 is a fragmentary side elevational view of the stack feeder of FIG. 1 illustrating the manner by which a stack of foliage is loaded from the ground onto the stack feeder.

Reference is now made to FIG. 8 which shows hydraulic fluid under pressure being delivered alternatively to fluid lines 330 and 332 with the other of said lines serving as the return line at any point in time. The hydraulic system of FIG. 8 alternatively drives the tilt cylinder 61 or the cylinders 90 and 160 which control the pattern of displacement of the cutting blade 128. More specifically, with the hydraulic tractor system 314 in the appropriate "on" position, the bed may be tilted into the position of FIG. 3 for receiving a stack 15 of foliage by placing three way, two position valve 334 into its dotted position as illustrated in FIG. 8 causing hydraulic fluid under pressure to be delivered to line 336 and into the trailing end of the cylinder 61 thereby extending the piston rod of cylinder 61 to tilt the bed as illustrated in FIG. 3, with exhaust fluid from the forward end of cylinder 61 being returned to the tractor hydraulic system 314 along line 330.

To level the bed once a stack 15 of foliage has been appropriately located on the bed, the tractor hydraulic system 314 is placed in its other "on" position causing hydraulic fluid under pressure to be delivered along line 330 to the leading end of cylinder 61 and exhausted from the trailing end thereof along line 336 across valve 334 to the tractor hydraulic system 314 thereby retracting the piston rod of cylinder 61.

When it is desired to drive the cutting blade through any one of its predetermined patterns of displacement to consecutively slice strips of foliage from the front of the stack 15, valve 334 is placed in the solid position illustrated in FIG. 8. Hydraulic fluid under pressure is introduced into either line 330 or 332, with the other line serving as a retirn line. Said hydraulic fluid under pressure is delivered to automatically reciprocating the valve 338, which selectively communicates hydraulic fluid between the leading end of cylinder 90 and the valve 38 along lines 340 and 342 and between the trailing end of the cylinder 90 and the valve 338 along hydraulic lines 344 and 346. Valve 338 may be any commercially available automatically reciprocating valve whereby fluid is alternatively delivered under pressure to the leading end and then to the trailing end of cylinder 90 on a timed basis. This defines the stroke of the cutting blade 128 from side to side. See blade path 170 in FIG. 5.

As earlier mentioned, the blade displacement 170 (FIG. 5) is caused by rotation of the mast 74 through approximately eighty degrees. Mast 74, as shown in FIG. 8, is equipped with two adjustable spaced cams 350. The actuator 352 of hydraulic switch 354 is located so as to be actuated at each one-half cycle of the mast 74 by engagement with one of the cams 350. Each time the actuator 352 of the valve 354 is actuated, a metered charge of hydraulic fluid is issued through one of the lines 356 and 358 to either the front or the rear of the cylinder 160. Such actuation of cylinder 160 vertically increments the cutting blade 128 to its next strip slicing position. When the sweep of the blade cuts a horizontal sweep, the mentioned displacement caused by cylinder 160 of the cutting blade 128 will be vertical, either up or down. The direction of incrementation caused by cylinder 160 continues until the entire face of the stack has been traversed by the blade. At this point in time, cylinder 116 will be bottomed out causing a back pressure within the hydraulic system which causes the tractor hydraulic system 314 to move to its "off" position. At this point in time in the manner previously described, the stack mover motor 63 is actuated and the stack caused by conveyors 38 to be advanced a distance adequate to cause a selected length of overhang of the static above the lateral conveyor 20. The tractor hydraulic system 314 is then placed in its other "on" position reversing the pressure return relationship of the lines 330 and 332. This commences once more the reciprocation of the blade 90 under force of cylinder 90 back and forth along path 170 (FIG. 5) and a charge of fluid periodically to be delivered through the other of the lines 356 and 358 to the cylinder 160 to periodically increment the blade to another strip slicing position but in a direction opposite to the previously mentioned incrementation. Thus, the blade may be caused to cut back and forth, up and down or in any other two dimensional pattern. The resulting cut at the face of the stack 15 is arcuate in two dimensions, i.e. up and down with the blade 128 at all times striking the surface of the stack 15 at an angle thereto during strip cutting. This prevents binding with the blade itself and the deflector 150, if it is used, causing the sliced strip to be pealed from the stack and fall by force of gravity upon the lateral conveyor from whence the sliced strips of foliage are discharged.

Reference is now made to FIG. 9 which illustrates the hydraulic system for driving hydraulic motor 112, which causes rotation of the blade 126. When it is desired to operate the blade motor 112, the tractor power take-off 304 is caused to rotate which in turn rotates coupling 306 and drives hydraulic pump 300. Hydraulic fluid is pressurized and discharged from the hydraulic pump 300 along line 382 and across pressure relief valve 384 and line 382 to the motor 112 to cause its constant speed rotation. The tank 372 is provided with an air vented filter. Fluid from the motor 112 is returned at low pressure through filter 378 to supply tank. Fluid is supplied to pump through line 370 as required. Rotation of blade motor 112 is terminated when rotation of the power take-off 304 is terminated.

Reference is now made to FIG. 10 which illustrates a second optional control system for the stack feeder machine 10. The hydraulic and electronic functions of the components as illustrated in FIG. 10 include the following events: (a) stack loading, (b) stack slicing in a desired bi-axial pattern, fully automated, (c) stack advancement integrated into the automatic strip slicing pattern and (d) lowering of the cutter to an idle state under no load conditions.

More specifically, broadly FIG. 10 schematically depicts a control panel 399, which is disposed at the tractor 12 together with certain cutting controls and controls comprising solenoid valves and hydraulic power units which accomplish the above-mentioned functions of the stack feeder 10. A source of electricl power 402, which is illustrated as the 12 volt DC battery source of the tractor 12, is provided. Electrical power is delivered across master fuse 404 and master switch 400, when closed, to power buss 408, buss 406 being at ground potential. Under these condition the indicator light 407 is "on" informing the operators that the control system of FIG. 10 is operative. Power from buss 408 is delivered to timer 410 and selectively therefrom to auto saw switch 416. At the same time power from buss 408 is communicated to the input of switches 418, 420, 422, 424, and 426.

Under the foregoing conditions, the tractor 12 and feeder 10 (in an empty state) are backed toward the stack 15. With the tractor hydraulic unit 314 operating, the wagon tilt switch 424 is placed in its "on" position. This delivers electrical power to the tilt safety portion of switch 436, when the saw blade 128 is disposed either to the right or left of the stack causes the lower portion of switch 426 to close. Accordingly, power reaching the lower or upper portion of switch 436 from switch 424 acuates solenoid valve 442 causing extension as previously described of tilt cylinder 61.

Tractor 12 and feeder 10 are thence displaced rearwardly to force the trailing end of the tilting bed under the leading edge of the stack 15. Simultaneously with or successive to said rearward displacement, the lower portion of switch 422 is caused to be placed in its downward "on" position, which actuates solenoid valve 442 causing stack mover hydraulic motor 63 to rotate in a forward direction. This in turn drives the top run of conveyors 38 forward toward the tractor with the conveyor protrusions 39 gripping the underside of the stack 14 and advancing it onto the tilted bed.

Once the stack 15 has been advanced onto the bed such that a selected short distance at the front of the stack 15 overhangs the lateral conveyor 20, with the cutting blade 128 remaining out of the way, the lower portion of switch 422 is returned to its "off" position, deactivating solenoid valve 440 and discontinuing rotation of hydraulic motor 63.

Switch 424 is then placed in its lower "on" position which reverses the actuation of solenoid valve 422 causing retraction of the cylinder 61 thereby displacing the bed from its tilting position of FIG. 3 to a horizontally level position.

Normally, with the stack loaded as indicated upon the feeder 10, the tractor 12 is caused to pull the feeder 10 to a location where it is desired to discharge the foliage, for example along the ground as the windrow with the tractor 12 being advanced slowly during the strip slicing operation, into feed bins or into other equipment for further processing. For the sake of simplicity, let it be assumed that range feeding of livestock is desired and that a windrow is to be placed upon the ground in the manner illustrated in FIG. 2. With the tractor 12 and feeder 10 located as desired in the field, the arm 110 and blade 128 are preferably initially placed in their up position above the overhanging leading end of the stack 15. The tractor power take-off 304, the hydraulic pump 300, the tractor hydraulic system 314 are activated and master switch 400 is on delivering power to the timer 410 and switches 418, 420, 422, 246 and 416 (through relays 412 and 414).

Under these conditions, the blade hydraulic motor 112 operates as described in conjunction with FIG. 9 and no futher description thereof is deemed necessary. Power from buss 408 is delivered across the upper contact of relay 412 to the lower contact of relay 414 and thence to the auto saw switch 416. With switch 416 "on", power is communicated to strip slice controlling switches 432, 436 and 434 (through 436) which control the automatic cutting operation. Switch 432 (through switch 418) actuates hydraulic solenoid valve 448 to drive the blade sweep cylinder 90 in and out of rotate the mast 74 back and forth. Switches 436 and 434 actuates hydraulic solenoid valve 446 to incrementally displace the blade intermittantly up in steps or down in steps. Hydraulic fluid under pressure supplied from the tractor hydraulic system 314 passes through solenoid valves 448 and/or 446 and 448 to drive cylinders 160 and 90 in the manner earlier described.

Lateral conveyor switch 426 is placed in its "on" condition, either up or down depending upon the direction it is desired to discharge strip slices of foliage from the machine 10. Hydraulic fluid from tractor hydraulic system 314 is delivered cross solenoid valve 444 after it is activated by placing switch 426 in the "on" condition and delivered thence to hydraulic motor 176 to cause the indicated displacement of lateral conveyor 20.

Any one of the lower part of switch 418, the upper parts of switches 422 or 420 if placed in an "on" condition (since the output of the indicated switch parts are ganged together) causes electrical power to be delivered to the coil of relay 414, cutting power to the auto switch 416 and auto load forward circuit.

The timer 410 is connected to the assembled plus 12 volt buss 408 and to the ground buss 406 for power. Wagon switch 430, when "on" delivers power to auto switch 416. This power in turn is delivered to the top +12 volt line of the timer 410. Switch 430 is physically carried on the feeder 10 and is caused to be "on" when the saw is either up or down. The timer then cycles as follows: (1) places power across the coil in relay 412, causing the relay to switch whereby power is no longer delivered across relay 412 to the auto saw switch 416 with power being delivered from the lower terminal of relay 412 across the second and third terminals from the top of relay 414 to the lower terminal of switch 422 to actuate the solenoid valve 440 causing hydraulic motor 63 to move the stack 15 forward for the interval of time during which timer 410 delivers power across the coil of relay 412; (2) when a set time has passed, timer 410 ceases to deliver power across the coil of relay 412 whereby relay 412 returns to its original position of delivering power to the auto switch 416 whereby solenoid valves 446 and 448 are again actuated and hydraulic cylinders 90 and 160 are caused to continue displacement of the cutting blade through its cutting pattern. It is preferred that timer 410 comprise delay circuits which prevent the timer from delivering electrical power across the coil of relay 412 for approximately ten seconds.

It is to be appreciated that auto saw switch 416 is a double pole on/off switch. One pole supplies power to the saw control switches 432, 436 and 434 (through 436). The other pole passes power from timer switch 430 to the timer 410 as earlier mentioned.

Switches 432 and 434 are two position on/on switches which are spring loaded to both of the two "on" positions. Switch 432 is mounted on the feeder 10 so as to be actuated by each back and forth rotation of the mast 74. Switch 432 is mounted juxtaposed the mast 74 such that the saw blade 121 must be all the way to the right or all the way to the left of the stack 15 before the switch 432 is operated, which reverses the horizontal direction along which the blade 128 is caused to arcuately move.

Switch 434 is physically mounted upon the feeder 10 in such a position that it is operated when the saw reaches its full up (adjustable to height of stack) or its full down position. Actuation of switch 434 reverses the signal traversing through switch 420 to the solenoid valve 446 thereby reversing the valve 446 and the direction of displacement of the cylinder 160.

Switch 436 in an on/off/on switch which is spring loaded to the "off" position. The switch 436 is physically mounted upon the feeder 10 so that it is operated by each back and forth rotation of the mast 74. Upon each operation, valve 436 issues a signal for a short predetermined interval of time actuating the solenoid valve 446 and causing a small incremental displacement of the cutting blade either up or down using the earlier described zig-zag pattern, the distance of the increment being selectively variable whereby the depth of each strip sliced from the leading end of the stack 14 may be selected as desired.

Timer switch 430 is an on/off/on switch which is spring loaded to its "off" position. Switch 430, as mentioned, provides a signal for the timer 410 when the saw is all the way up or down, whereby the stack is displaced a desired distance forward preparatory to slicing a further set of strips from the face thereof.

Switches 418, 420 and 422 are double pole three position switches and perform two functions. One pole in each switch supplies power to relay 414 in either "on" position to cut power to the auto saw or auto forward feed. The other pole in each switch performs the function indicated on FIG. 10 immediately to the right of the pole, i.e. back and forth displacement of the blade up and down displacement of the blade and stack displacement. All automatic operations described above may be performed by operating switches 418, 420, or 422 by hand which overrides auto operation.

From the foregoing it should be readily apparent that the cutting blade 128 may be caused to be displaced through any two dimensional (if properly programmed) matrix to slice a series of strips from the leading edge of the stack 15, when the stack is properly positioned above the lateral conveyor 20. The strips may be cut horizontally, vertically, diagonally, circularly and spirally, for example. The x and y displacements, whether successively or compositely are controlled such that the blade in an automatic fashion traverses its strip slicing pattern with little or no control by the operator. In addition, the stack is automatically moved forward a desired predetermined distance each time the strip slicing procedure through a given stack distance has been completed. The ultimate composite cut on the face of the stack is a two dimensional convexity, It should also be apparent that the pattern of blade displacement to slice strips of hay from the face of the stack may constitute a cycle followed by a reversal of the cycle. Thus, with programming the cutting blade 128 may be caused, for example, to cut horizontal strips from the face of the stack first in a downward direction and, thereafter in an upward direction (with the stack being moved forward a short distance after downward displacement is completed and before upward displacement is commenced.

With further refernece to FIG. 10, the present invention contemplates using a plurality of strain gauges 500 variously mounted upon or adjacent the frame of the feeder 10 whereby signals taken in toto supply to an electronic scale 502 the weight being supported by the feeder frame. By zeroing the empty weight of the feeder 10 provided by electronic scale 502, the weight of the stack initially and from to time time thereafter during strip slicing may be ascertained. It is presently preferred that the electronic scale 502 be a suitable mini-computer, well known in the art, or the instrumentation system disclosed in copending U.S. Pat. application Ser. No. 917,997, filed on even date herewith and assigned to the Assignee of the present invention. Power for operating the electronic scale 502 is illustrated in FIG. 10 as being supplied from the tractor battery 402 across the control panel 399.

A farmer, by inventorying the weight of stacks of foliage harvested (utilizing the strain gauge and electronic scale approach mentioned above), may be informed as to the weight of his foliage as winter commences. By laboratory examination of the foliage, its food value may be ascertained. Based upon size of the herd of livestock to be fed, an accurate determination may be reached as to how much feed should be dispensed per day to the livestock in question in order that the animals receive adequate nutrition. The electronic scale 502 is, accordingly, used on a daily basis to deliver the proper weight of foliage to the livestock in question to satisfy the mentioned nutritional requirements. Once the electronic scale 502 informs the operator that sufficient weight has been discharged from the feeder 10, strip slicing may be discontinued pending the next feeding. By keeping tract via the electronic scale 502 or otherwise of foliage used from inventory, the farmer is informed as to the current foliage inventory and may readily determine at any point in time the adequacy of that inventory to meet his anticipated livestock nutritional needs for the remainder of the winter.

The invention may be embodied in other specific forms without departing from the spirit or essential characteristics thereof. The present embodiments are therefore considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of strip slicing foliage from the end of a stack thereof comprising the steps of:
    placing the stack of foliage upon a vehicle and causing one end thereof to be disposed generally above a lateral cut foliage conveyor and generally below a cantilevered cutting mechanism facing the stack and comprising rotatable blade means;
    rotating the blade while biaxially pivoting without rotating the cantilevered cutting mechanism from at least one location remote from the blade in a predetermined two dimensional pattern to successively slice side to side arcuate strips of foliage from adjacent sites at the face of the stack thereby shaping said face into a convex surface, which strips are caused to fall upon the lateral conveyor.

2. A method according to claim 1 further comprising the step of prying away from the stack with non-rotating deflector structure adjacent the rotating blade each strip as it is cut whereby the sliced hay is caused to substantially continuously and uniformly be supplied to the lateral conveyor.

3. A method according to claim 1 further comprising the step of maintaining at all times blade orientation at an acute angle to the convex face of the stack.

4. A method of strip slicing foliage from the end of a stack thereof comprising the steps of:
    placing the stack of foliage upon a vehicle and causing one end thereof to be disposed generally above a lateral cut foliage conveyor and generally below a cantilevered cutting mechanism facing the stack and comprising rotatable blade means;

rotating the blade while displacing the cantilevered cutting mechanism in a predetermined two dimensional pattern to successively slice arcuate strips of foliage from adjacent sites at the face of the stack thereby shaping said face into a convex surface, which strips are caused to fall upon the lateral conveyor;

adjustably controlling the magnitude of at least part of said two dimensional pattern of displacement to accommodate variations in stack dimensions, stack density, moisture content and the grain pattern of the foliage and the like.

5. A stack feeder comprising:
a stack-receiving vehicle;
lateral conveyor means;
means for selectively advancing the stack upon the vehicle into a position generally above the lateral conveyor means;
a cutting mechanism comprising non-rotating cantilever beam means and rotatable blade means carried at the distal end of the cantilever beam means;
means supporting the cantilever beam means comprising means accommodating biaxial pivoting of the cantilever beam means for substantially a common site;
means for selectively rotating the blade;
selectively operable means for biaxially pivoting the cantilever beam means and the blade means through at least one of several possible two dimension cutting patterns to horizontally slice a series of arcuate strips of foliage from the end of the stack, which strips fall upon the lateral conveyor means.

6. A stack feeder according to claim 5 wherein said supporting means comprise vertically directed mast means disposed substantially directly in front of the strips cut by the rotating blade means.

7. A stack feeder according to claim 5 wherein said rotatable blade means comprises a blade of relatively small diameter.

8. A stack feeder according to claim 5 wherein motor means carried by the cantilever beam means rotate the blade means.

9. A stack feeder comprising:
a stack-receiving vehicle;
lateral conveyor means;
means for selectively advancing the stack upon the vehicle into a position generally above the lateral conveyor means;
a cutting mechanism comprising cantilever beam means and rotatable blade means carried at the distal end of the cantilever beam means;
means supporting the cutting means, the supporting means comprising a vertically extending mast selectively rotated back and forth about its axis by first power means, said cantilever beam being selectively lifted and lowered by second power means;
means for selectively rotating the blade;
selectively operable means for successively displacing the blade means through at least one of several possible two dimension cutting patterns to horizontally slice a series of strips of foliage from the end of the stack, which strips fall upon the lateral conveyor means.

10. A stack feeder comprising:
a stack-receiving vehicle;
lateral conveyor means;
means for selectively advancing the stack upon the vehicle into a position generally above the lateral conveyor means;
a cutting mechanism comprising cantilever beam means and rotatable blade means carried at the distal end of the cantilever beam means;
means supporting the cutting means;
means for selectively rotating the blade;
selectively operable means for successively displacing the blade means through at least one of several possible two dimension cutting patterns to horizontally slice a series of strips of foliage from the end of the stack, which strips fall upon the lateral conveyor means;
control means for selectively setting the rate of motion of one or more of said lateral conveyor means, advancing means, rotating means and selectively operable means to meter foliage discharged by the lateral conveyor means to correlate with variations in density, moisture content, stack dimensions, the grain pattern of the foliage and the like.

11. A stack feeder comprising:
a stack-receiving vehicle;
means for selectively automatically advancing the stack in respect to the vehicle a short distance from time to time;
means for discharging foliage cut from the stack;
a traveling cutter unit;
means supporting the cutter unit for displacement;
the traveling cutter unit comprising (a) rotatable blade means for slicing foliage from the stack, (b) power means for rotating the blade means and (c) two dimensional power means displacing the traveling cutter unit through any one of several cutting patterns along the end of the stack.

12. A method of strip slicing foliage from the end of a stack thereof comprising the steps of:
placing the stack of foliage upon a vehicle and causing one end thereof to be disposed generally above a lateral cut foliage conveyor and generally below a cantilevered cutting mechanism facing the stack and comprising rotatable blade means;
rotating the blade while displacing the cantilevered cutting mechanism is a predetermined two dimensional pattern to successively slice arcuate strips of foliage from adjacent sites at the face of the stack thereby shaping said face into a convex surface, which strips are caused to fall upon the lateral conveyor;
advancing the stack a short controlled distance after completion of said two dimensional cutting pattern and traversing a second two dimensional cutting pattern comprising the reverse of the first pattern.

13. A method of cutting foliage from a stack disposed upon a vehicle comprising the steps of:
automatically cycling a cutting blade through a two dimensional cutting pattern contiguous with one end of the stack to cut a slice therefrom;
laterally continuously discharging the sliced foliage from the vehicle;
automatically interrupting the cycling step;
causing the cutting blade to be in a non-interfering position;
automatically advancing the stack toward the cutting pattern location a distance equal to the slice thickness desired;

automatically terminating the stack advancement and initiating another automatic two dimensional cutting blade cycle.

14. A method of metering foliage comprising the steps of:
 (a) creating an electrical data representative of the empty weight of a stack slicing vehicle;
 (b) loading a stack of foliage upon the vehicle;
 (c) creating other electrical data representative of the combined weight of the loaded stack and vehicle;
 (d) delivering the electrical data representative of said two weights to electronic circuitry and generating the difference comprising the weight of the stack;
 (e) cutting slices from the stack and discharging the sliced foliage from the vehicle;
 (f) repeating step (c) during or after step (e), whereby the weight of the remainder of the stack and the weight of sliced foliage are generated.

15. A method of cutting a series of slices of foliage from a stack upon a vehicle comprising biaxially pivoting from a location remote from the stack a cutting blade side to side and up and down through a composite two dimensional arcute pattern and forming a face by said cutting against the stack which is both horizontally and vertically convex.

16. A foliage inventory system comprising the steps of:
 weighing foliage by strain gauge measurements of one or more harvesting machines in which stacks consisting of said foliage are formed;
 generating the cumulative weight of all said stacks;
 placing all said stacks in storage upon the ground;
 cutting and feeding foliage from said stacks in inventory using one or more stack feeder machines while strain gauge weighing the stacks and any part thereof so cut and fed;
 generating the remaining cumulative foliage by weight in inventory from time to time.

17. Apparatus for metering foliage comprising:
 means weighing a stack slicing vehicle when empty, when loaded with a stack of foliage and when supporting the remainder of a partially sliced stack comprising means sensing the strain upon various parts of the vehicle at different points in time and means generating electrical signals representative of said weight;
 means for loading a stack of foliage upon the vehicle;
 means cutting slices from the stack an discharging the sliced foliage from the vehicle;
 means delivering said electrical signals to subtraction means comprising means by which the empty weight of the vehicle is negated and the instantaneous weight of the foliage on the vehicle and the weight of sliced and discharged foliage, if any, are generated.

18. A foliage inventory apparatus comprising:
 at least one foliage harvesting machine comprising strain gauge means weighing the empty machine and weighing the machine and the foliage carried by the machine from the field to a storage site each time the machine is fully loaded;
 means subtractively combining the two above-mentioned weights to establish the net weight of each full load of foliage placed in storage;
 means cumulatively sensing the weight of all loads of foliage placed in storage;
 at least one feeder machine upon which successive loads of foliage are placed, the feeder machine comprising means feeding foliage sequentially from loads of foliage placed on the feeder machine and strain gauge means sensing the weight of all foliage so fed by the feeder machine from inventory;
 means continuously subtractively combining the weight of all fed foliage with the cumulative weight of all foliage in storage to establish the on-going weight of storage foliage not yet so fed.

* * * * *